United States Patent
Yamagishi

(10) Patent No.: US 6,341,049 B1
(45) Date of Patent: Jan. 22, 2002

(54) CASSETTE LOADING MECHANISM

(75) Inventor: Hiromasa Yamagishi, Ikoma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/469,236

(22) Filed: Dec. 22, 1999

(30) Foreign Application Priority Data

Dec. 28, 1998 (JP) .......................................... 10-371911

(51) Int. Cl.$^7$ .......................................... G11B 15/675
(52) U.S. Cl. .................................................... 360/96.5
(58) Field of Search ............................... 360/96.5, 137, 360/96.1, 93, 90, 88

(56) References Cited

U.S. PATENT DOCUMENTS

| | | | | |
|---|---|---|---|---|
| 5,153,792 A | * | 10/1992 | Kawano | 360/99.01 |
| 5,331,484 A | * | 7/1994 | Klos-Hein et al. | 360/96.5 |
| 5,390,056 A | * | 2/1995 | Kawada | 360/94 |
| 5,535,071 A | | 7/1996 | Yamagishi et al. | 360/96.5 |
| 5,581,431 A | * | 12/1996 | d'Arc | 360/137 |
| 5,708,538 A | * | 1/1998 | Fujino et al. | 360/96.5 |

* cited by examiner

Primary Examiner—Brian E. Miller
Assistant Examiner—Angel Castro
(74) Attorney, Agent, or Firm—Armstrong, Westerman, Hattori & McLeland & Naughton, LLP

(57) ABSTRACT

A cassette loading mechanism comprises a tray disposed inwardly of a side plate on a chassis and movable in a cassette loading direction for holding a cassette, and a loading member disposed externally of the side plate for driving the tray. The side plate is provided with engaging pieces corresponding to an upper end and a lower end of the loading member. The loading member is formed in the lower end thereof corresponding to the engaging piece with a cutout for permitting the loading member to move to inside the engaging piece when positioned for mounting on the side plate. The loading member is mounted on the side plate by fitting the upper end thereof to the other engaging piece of the side plate and causing the other end of the loading member to clear the engaging piece at the cutout and to move to inside of the engaging piece. The loading member is slidable from the mounted position to move within a range in which the loading member is in engagement with the side plate.

3 Claims, 9 Drawing Sheets

LOADING DIRECTION →

LOADING DIRECTION

CASSETTE EJECTING DIRECTION

CASSETTE LOADING MECHANISM

FIELD OF THE INVENTION

The present invention relates to cassette loading mechanisms for use in magnetic recording-playback devices such as VTRs for removably loading a cassette onto the chassis of the device.

BACKGROUND OF THE INVENTION

FIG. 9 is a perspective view of a cassette 6 and a tray 3 for holding the cassette 6 as will be described below. The tray 3 has wall plates 32, 32 provided upright at opposite sides thereof and each having two pins 30, 31 projecting outward therefrom. The tray 3 has a lug 33 projecting upward from its front end and to be pushed by the front end of the cassette 6.

The present applicant has previously disclosed a cassette loading mechanism shown in FIG. 10 ( see U.S. Pat. No. 5,535,071). The tray 3 described is provided inwardly of side plates 2 disposed upright on a chassis 1 and has its pins 30, 31 fitted in respective first and second guide slits 20, 21 formed in the side plate 2.

Three gears 5, 50, 51 are arranged on the outer side of the side plate 2. The gear 51 in the most downstream position is provided with a leg 52 having the pin 31 of the tray 3 fitted therein. When the gear 5 in the most upstream position is rotatingly driven, the gear 51 rotates, moving the tray 3 along the guide slots 20, 21.

Projecting from a side wall of the chassis 1 are a pair of support members 9, 9. A loading member 4 extending in the cassette loading direction for driving the tray 3 has the support members 9, 9 fitted therein. The loading member 4 is formed with mount openings 92, 92 for the two corresponding support members 9, 9 to fit in and with a rack 40 at its upper end. Each support member 9 comprises a shank 90 and a head 91 of increased diameter at the outer end of the shank. The mount opening 92 comprises a slit 93 extending in the cassette loading direction and a large hole 94 formed at one end of the slit 93 for the head 91 to fit in.

In mounting the loading member 4 on the chassis 1, the head 91 of each support member 9 is positioned as opposed to the large hole 94 of the corresponding mount opening 92, and the loading member 4 is fitted around the support member 9. Next, the loading member 4 is moved toward a cassette ejecting direction a distance a (see FIG. 10) to cause the shank 90 to fit into the slit 93. The loading member 4 is prevented from slipping off the chassis 1 by the head 91 of the support member 9. The side plate 2 provided with the gear 5, etc. is thereafter attached to the chassis 1. The gear 5 is in mesh with the rack 40 when the mechanism is in condition for the start of cassette loading.

Provided on the rear side of the chassis 1 is an operation gear 10 rotatable by a motor (not shown) and meshing with teeth 53 projecting from the lower end of the loading member 4. The rotation of the operation gear 10 is transmitted to the gear 5 by the loading member 4.

FIGS. 11A and 11B are right side elevations of the cassette loading mechanism, FIG. 11A showing the mechanism in a standby state for cassette loading, FIG. 11B showing the mechanism during cassette loading. When the cassette 6 is placed onto the tray 3 in the standby state, a cassette-in sensor switch (not shown) disposed on the path of travel of the tray 3 is turned on, whereupon the operation gear 10 (see FIG. 10) is rotated. This moves the loading member 4 and the tray 3, loading the cassette 6 in place.

However, the conventional cassette loading mechanism has the following problems.

When used singly, the support member 9 is unable to support the loading member 4 with good stability, so that the loading member 4 needs to be supported by at least two support members 9, 9 which are arranged at different locations.

Since the mount openings 92, 92 of the loading member 4 are arranged side by side along the cassette loading direction as seen in FIG. 10, the loading member 4 becomes elongated and large-sized. The chassis 1 provided with the support members 9, 9 is also large-sized.

Further the loading member 4 is fitted around each support member 9 and then moved toward the cassette ejecting direction a distance a for mounting. If this distance a is short, however, the loading member 4 is likely to slip off the chassis 1 when the chassis 1 is subjected to an impact while attaching the side plate 2 to the chassis 1. The distance a therefore needs to be great. This also makes the loading member 4 and the chassis 1 large-sized. Whereas it is required that such a magnetic recording-playback device be compact in its entirety, the loading member 4 and the chassis 1 which are large-sized are in conflict with this requirement.

SUMMARY OF THE INVENTION

An object of the present invention is to compact the member for driving the tray and the chassis.

A side plate 2 disposed upright on a chassis 1 is provided with engaging pieces 8, 80 parallel to each other and corresponding to an upper end and a lower end of a loading member 4.

The loading member 4 is formed, in the end thereof corresponding to one of the engaging pieces 8, 80, with a cutout 49 for permitting the loading member 4 to move to inside the engaging piece 80 when positioned for mounting on the side plate 2.

The loading member 4 is mounted on the side plate 2 by fitting the end thereof not having the cutout 49 to the other engaging piece 8 of the side plate 2 and causing the other end of the loading member 4 to clear the engaging piece 80 at the cutout 49 and to move to inside of the engaging piece 80. The loading member 4 is slidable from the mounted position to move within a range in which the loading member 4 is in engagement with the side plate 2.

The engaging pieces 8, 80 are provided on the side late 2 in corresponding relation with the upper end and the lower end of the loading member 4 and therefore serve to make the loading member more compact than in the conventional mechanism wherein the two mount openings in the loading member are arranged side by side along the loading direction.

When the loading member 4 is positioned for mounting on the side plate 2, the upper end or lower end of the loading member 4 is in engagement with the engaging piece 8. Accordingly, the loading member 4 can be engaged with the side plate 2 by sliding the member 4 from the mounting position such a distance that the upper or lower end of the loading member 4 which is out of engagement in the mounting position is engaged by the other engaging piece 80.

When in the mounting position, the conventional loading member 4 is not engaged with the chassis 1 and is therefore likely to slip off the support members 9, 9 unless the distance a the member 4 is to be moved from the mounting position is great (see FIG. 10). According to the present invention, however, the loading member 4, when positioned for mounting, has its upper or lower end already engaged with the side plate 2 and is less likely to slip off inadvertently from this position. This shortens the distance a the loading member 4 is to be slidingly moved from the mounting position for engagement with the side plate 2, consequently compacting the loading member 4 and the chassis 1 having the side plate 2.

DETAILED DESCRIPTION OF THE PREFERRED EMBODIMENTS

Embodiments of the invention will be described below in detail with reference to the drawings concerned.

[Overall Construction]

Figure 1:
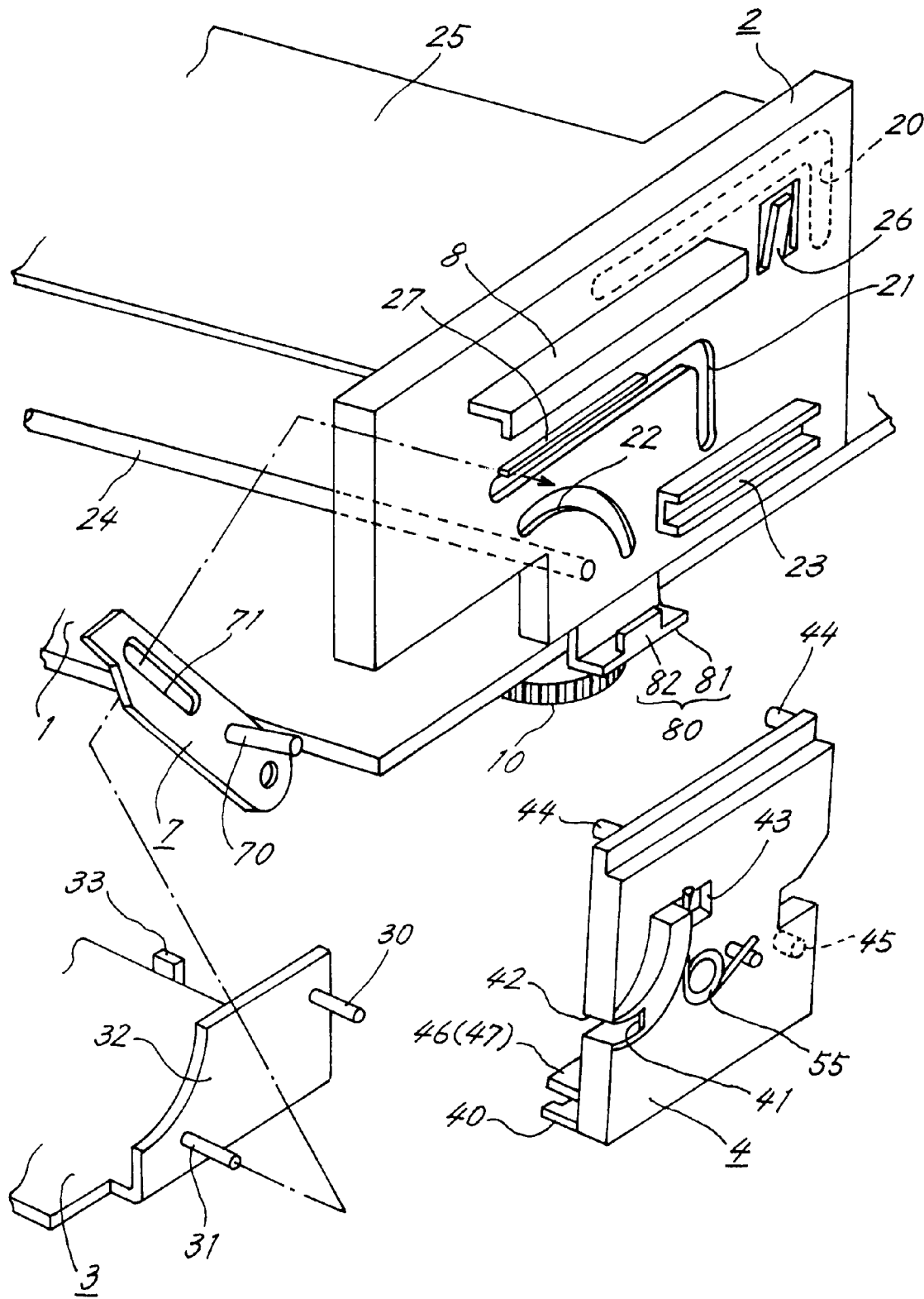
FIG. 1 is an exploded perspective view of a cassette loading mechanism.
Figure 2:
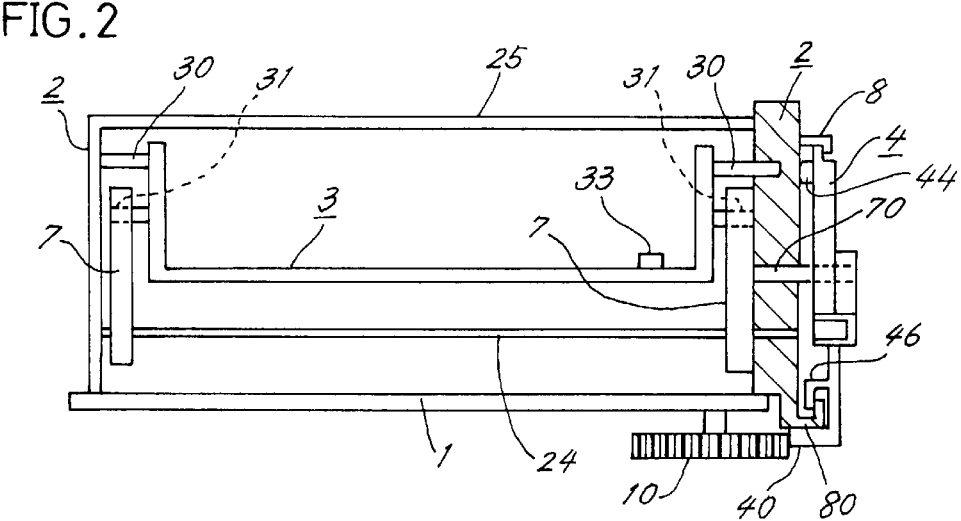
FIG. 2 is a front view of the cassette loading mechanism.

FIG. 1 is an exploded perspective view of a cassette loading mechanism, and FIG. 2 is a front view of the mechanism as it is seen from the cassette insertion side thereof.

Provided upright on a chassis 1 is a slide plate 2 which is formed with first and second guide slots 20, 21 for pins 30, 31 on a tray 3 to fit in respectively. Although FIG. 1 shows two guide slots 20, 21, the number of slots is not limited to two, but three slots may be provided for the tray 3 to move with good stability.

Another side plate 2 is provided also at the left side of the chassis 1 (see FIG. 2), and the two side plates 2, 2 are interconnected by a top plate 25 and a connecting rod 24 disposed at the lower end of the side plates 2. Disposed inwardly of each side plate 2 is a pivotal lever 7 having a base end fitting to the connecting rod 24 and a forward end formed with a slit 71, which has the pin 31 of the tray 3 fitted therein. A fitting pin 70 projects outward from a portion of the pivotal lever 7 away from its midportion toward the base end and extends through a circular-arc aperture 22 formed in the side plate 2.

A cassette inlet between the side plates 2, 2 is provided with a door 65 pivoted at its upper end to the side plates 2 (see FIGS. 4A and 4B), and a door opener (not shown) for opening the door 65 has a base end fitted to the connecting rod 24.

A loading member 4 in the form of a plate is disposed externally of and opposed to the side plate 2 shown in FIG. 1. The side plate 2 is provided with a first engaging piece 8 extending in the cassette loading direction between the first and second guide slots 20, 21 thereof. Projecting from a lower end portion of the side plate 2 is a bent lug 81 positioned externally of the chassis 1 and having an outwardly bent lower end. The bent lug 81 has at its outer extremity an upward projection 82. The bent lug 81 and the projection 82 provide a second engaging piece 80. The loading member 4 is engageable with the first and second engaging pieces 8 and 80.

Provided on the rear side of the chassis 1 is an operation gear 10 disposed under the second engaging piece 80 and rotatable by a motor (not shown). The operation gear 10 is in mesh with a rack 40 inwardly projecting from the lower end of the loading member 4. Projecting from the inner surface of the loading member 4 is a holder 46 positioned above the rack 30. The second engaging piece 80 fits in between the holder 46 and the rack 40.

An elastic piece 26 having an outwardly projecting upper end is provided on the side plate 2 in front of the first engaging piece 8. The elastic piece 26 is pushed in by the loading member 4 when the member 4 is mounted.

Contact pins 44, 44 facing inward are provided on the loading member 4 at upper end portions thereof. The inner ends of the contact pins 44, 44 are in contact with the side plate 2, with the upper end of the loading member 4 engaged with the first engaging piece 8 (see FIG. 2). A guide pin 45 projecting inward from a front end portion of the loading member 4 fits in a guide channel member 23 on the side plate 2 for guiding the movement of the loading member 4 in the cassette loading direction.

Figure 4A:
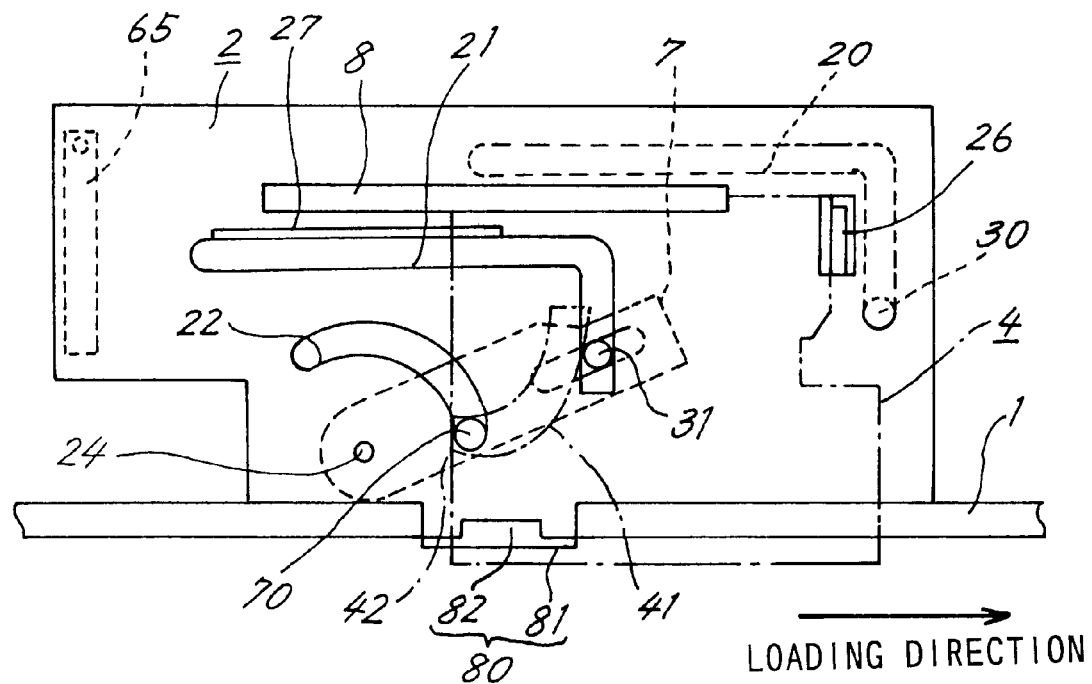
FIGS. 4A and 4B are right side elevations of the cassette loading mechanism, FIG. 4A showing the mechanism on completion of cassette loading, FIG. 4B showing the same in a standby state for cassette loading.
Figure 4B:
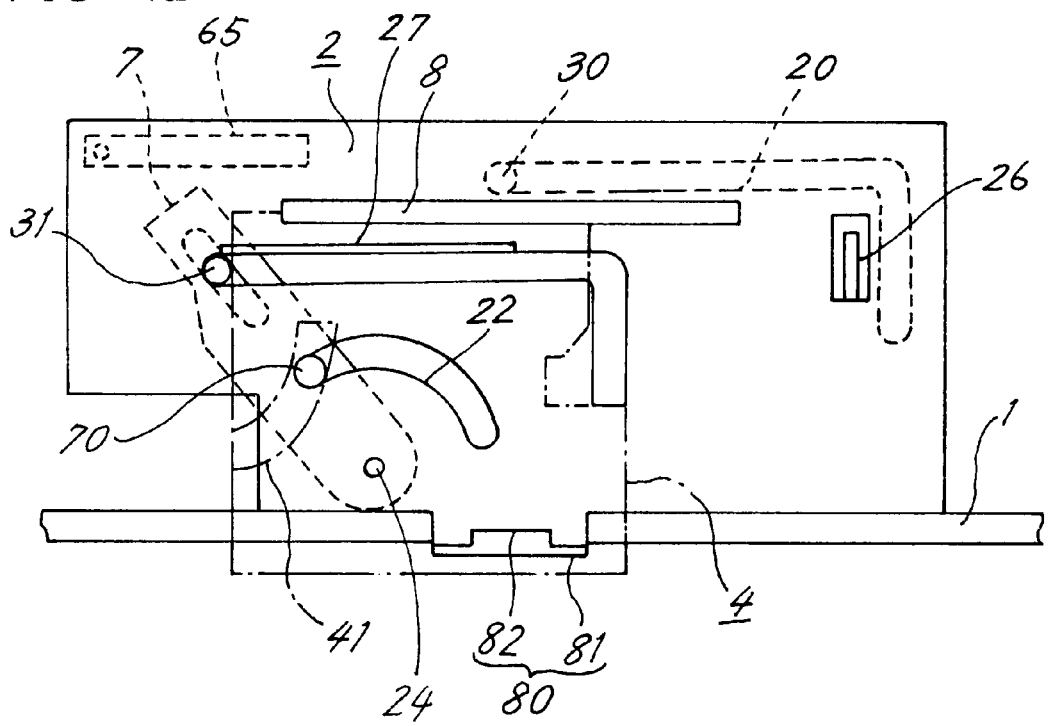

Formed in the midportion of the loading member 4 is a cam groove 41 having a lower end opened as at 42 and extending obliquely upward from the opening 42. The fitting pin 70 of the pivotal lever 7 has its outer end fitted in the cam groove 41. With reference to FIGS. 4A and 4B which are right side elevations of the side plate 2, the fitting pin 70 is opposed to the opening 42 of the cam groove 41 on completion of cassette loading as seen in FIG. 4A, while the fitting pin 70 is positioned at an upper end portion of the cam groove 41 when the mechanism is in a standby state for cassette loading. A rib 27 extending in the cassette loading direction is disposed between the first engaging piece 8 and the second guide slot 21. With the loading member 4 mounted on the side plate 2, the left contact pin 44 fits in between the first engaging piece 8 and the rib 27 (see FIG. 6B).

[Details of the Loading Member]

Figure 3A:
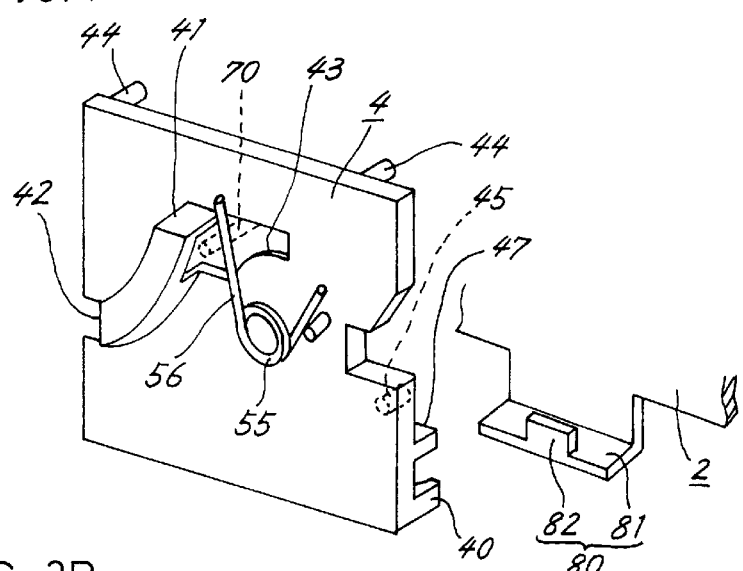
FIG. 3A is a perspective view of a loading member.
Figure 3B:
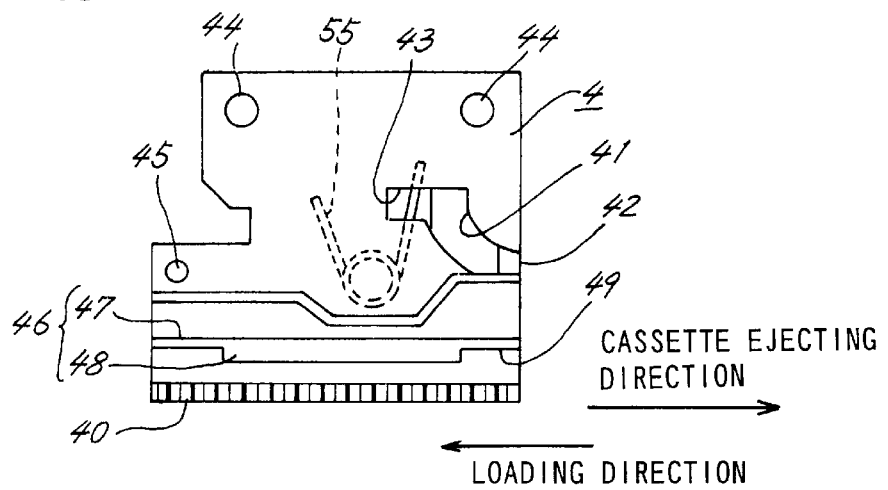
FIG. 3B is a rear view of the loading member.

FIG. 3A is a perspective view of the loading member 4, and FIG. 3B is a view showing the loading member 4 as it is seen from the rear side thereof. A window 43 is formed in the loading member 4 slightly above its center portion and is continuous with the upper end of the cam groove 41. When the mechanism is in the standby state for cassette loading, the fitting pin 70 is exposed from the window 43. A torsion spring 55 is provided on the loading member 4 at its center portion and has one leg 56 extending toward the window 43. In the standby state for cassette loading, the fitting pin 70 holds the torsion spring 70 deflectively deformed, with the pivotal lever 7 turned by the pin 31 on the tray 3 as will be described later.

As shown in FIGS. 3B and 2, the holder 46 comprises a horizontal plate 47 and a latch plate 48 extending downward from the inner end of the plate 47. The latch plate 48 has a cutout 49 in the end thereof toward the cassette ejection side.

[Mounting the Loading Member]

The loading plate 4 is mounted on the side plate 2 by the following procedure.

Figure 6A:
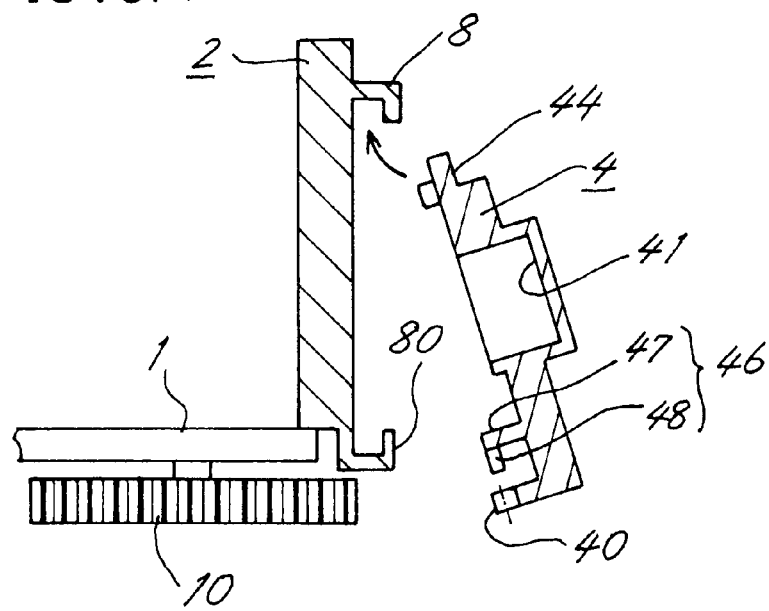
FIG. 6A is a view in section partly broken away and showing the loading member when the member is to be mounted on a side plate.
Figure 6B:
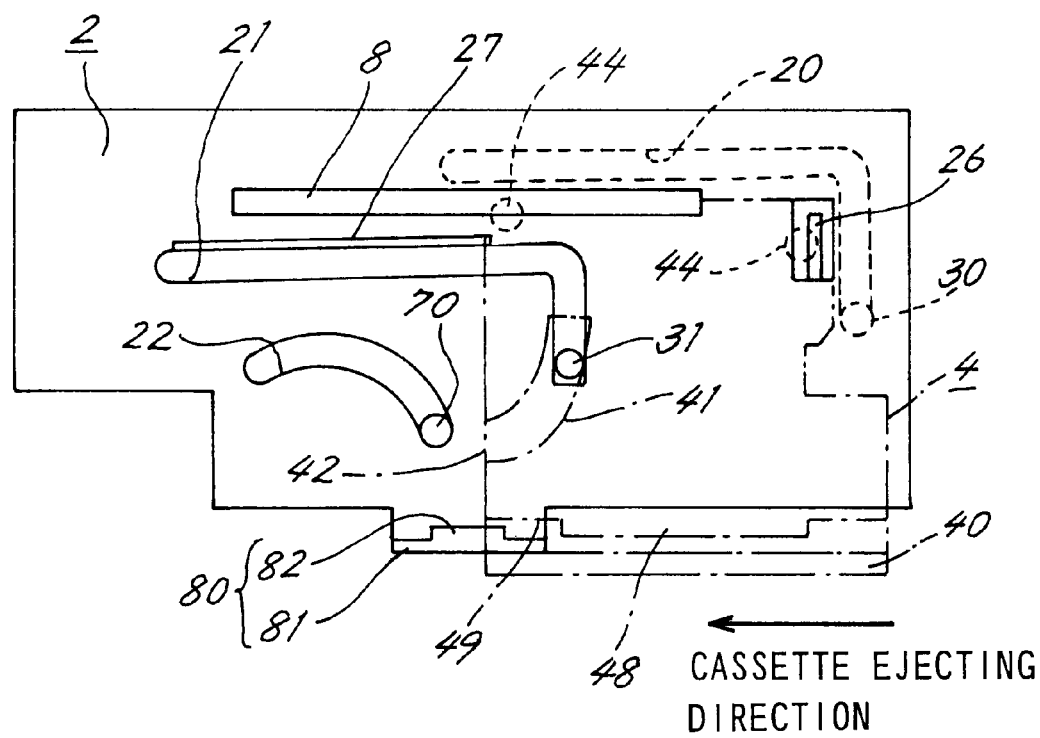
FIG. 6B is a side elevation showing a loading member mounted position.
Figure 7A:
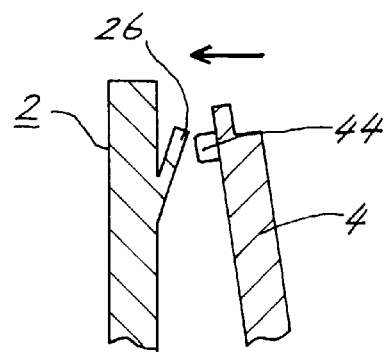
FIG. 7A is a view in section showing the position relationship between an elastic piece and the loading member when the loading member is to be mounted on the side plate.
Figure 7B:
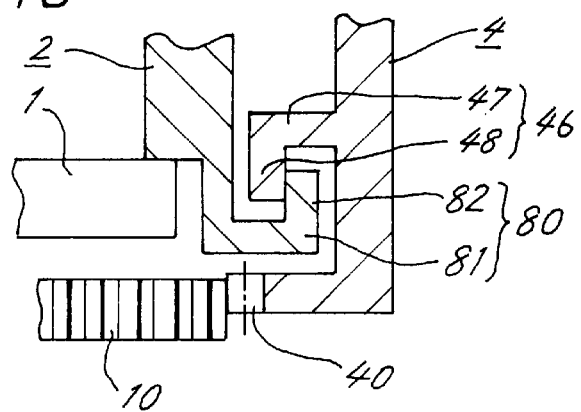
FIG. 7B is an enlarged view showing the loading member in engagement with a second engaging piece on the side plate.

FIG. 6A is a sectional view partly broken away and showing the loading member 4 while it is to be mounted on the side plate 2, with the tray 3 omitted from the illustration. FIG. 6B is a side elevation showing the position where the loading member 4 is to be mounted. FIG. 7A is a view in section showing the position relationship between the elastic piece 26 and the loading member 4 when the loading member 4 is to be mounted on the side plate 2, and FIG. 7B is an enlarged view showing the loading member 4 in engagement with a second engaging piece 80 on the side plate 2.

First, the tray 3 is moved to a position where it is located on completion of cassette loading. As shown in FIG. 6B, the pins 30, 31 on the tray 3 are at the lower ends of the respective first and second guide slots 20, 21, and the fitting pin 70 of the pivotal lever 7 is in contact with the clockwise end of the circular-arc apertured portion 22 of the side plate 2. Subsequently, the loading member 4 is brought to the mounting position wherein the fitting pin 70 of the pivotal lever 7 is opposed to the opening 42 of the cam groove 41, and the contact pin 44 toward the loading direction is opposed to the elastic piece 26. At this time, the cutout 49 in the latch plate 48 of the loading member 4 is opposed to the projection 82 of the side plate 2, permitting the latch plate 48 to move to inside the projection 82.

As shown in FIG. 6A, the loading member 4 is lowered from the mounting position once and then inserted into the first engaging piece 8 obliquely from below, causing the first engaging piece 8 to engage the upper end of the member 4. The contact pin 44 at the left fits in between the first engaging piece 8 and the rib 27, and the loading member 4 has it upper end engaged with the side plate 2. The loading member 4 in this state is pushed in toward the side plate 2. As shown in FIG. 7A, the contact pin 44 toward the cassette loading direction deflects and deforms the elastic piece 26 by pushing. Further as seen in FIG. 7B, the latch plate 48 advances to inside the projection 82, permitting the second engaging piece 80 to fit in between the horizontal plate 47 of the loading member 4 and the rack 40 thereof. The rack 4 of the loading member 4 meshes with the operation gear 10.

The loading member 4 is thereafter moved toward the cassette ejecting direction. The latch plate 48 of the loading member 4 is engaged by the projection 82. The loading member 4 is prevented from slipping off the chassis 1 by the first and second engaging pieces 8, 80. When the loading piece 4 is further moved toward the cassette ejecting direction, the fitting pin 70 of the pivotal lever 7 moves along the cam groove 41 as shown in FIG. 4B, moving the tray 3 to the standby position for cassette loading.

[Safety Mechanism for Cassette Loading]

Figure 9:
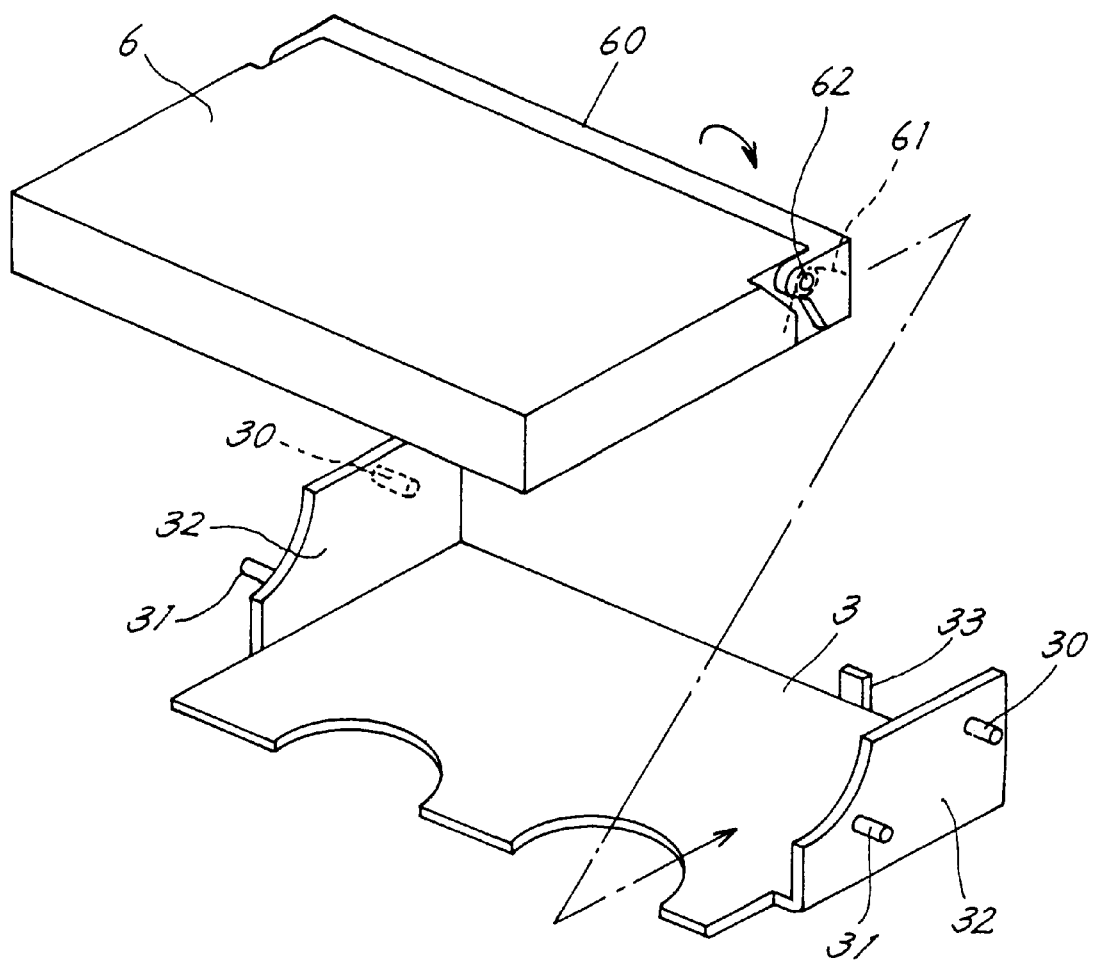
FIG. 9 is a perspective view of the cassette and a tray.
Figure 10:
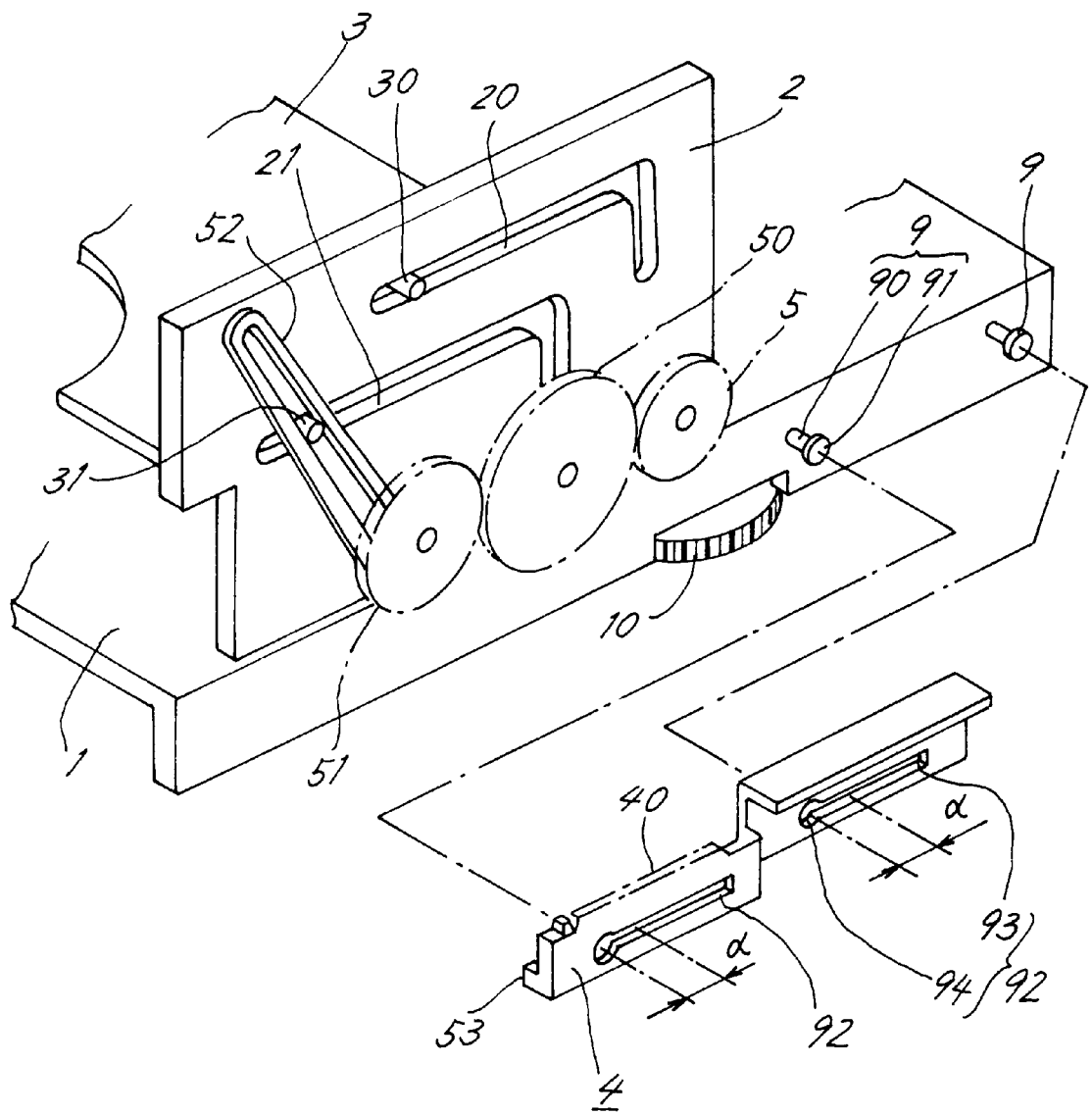
FIG. 10 is an exploded perspective view of a conventional cassette loading mechanism.
Figure 11A:
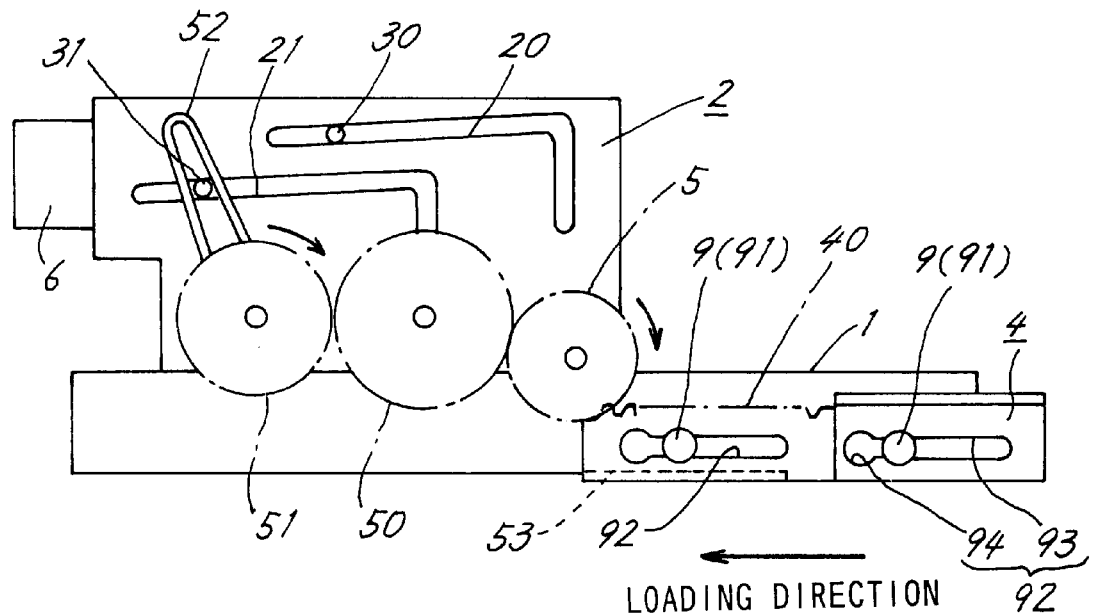
FIGS. 11A and 11B are right side elevations of the conventional cassette loading mechanism, FIG. 11A showing the mechanism in a standby state for cassette loading, FIG. 11B showing the same in the course of cassette loading.
Figure 11B:
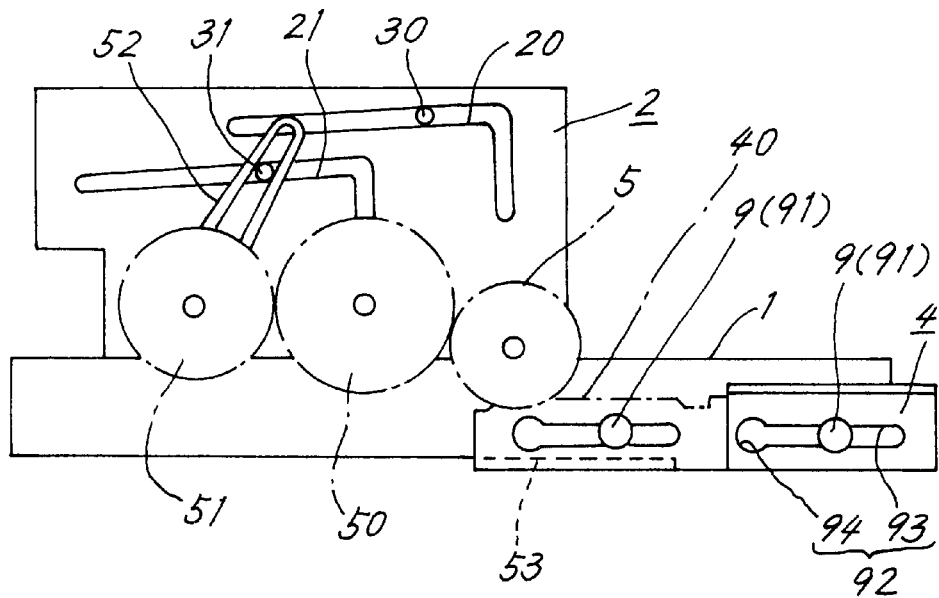

When the user inserts a cassette 6 into the tray 3 in the standby position for cassette loading, the cassette 6 moves the tray 3 by pushing a lug 33 (see FIG. 9) of the tray 3. The cassette 6 is not loaded immediately at this time, but cassette loading is started after the tray 3 as pushed in by the cassette 6 a predetermined amount has been detected, thus preventing the cassette 6 from being loaded before it is fully inserted. This procedure will be described below.

Figure 5A:
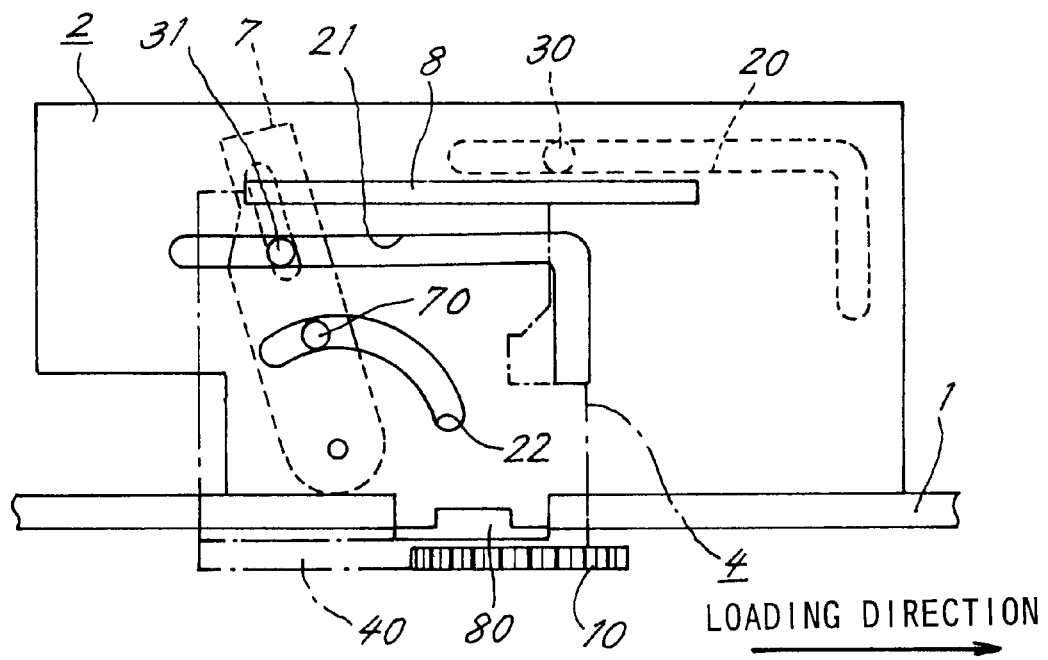
FIGS. 5A and 5B are right side elevations of the cassette loading mechanism with a cassette placed therein, FIG. 5A showing the position relationship between the loading member and a pivotal lever, FIG. 5B showing the position relationship between the loading member and a torsion spring.
Figure 5B:
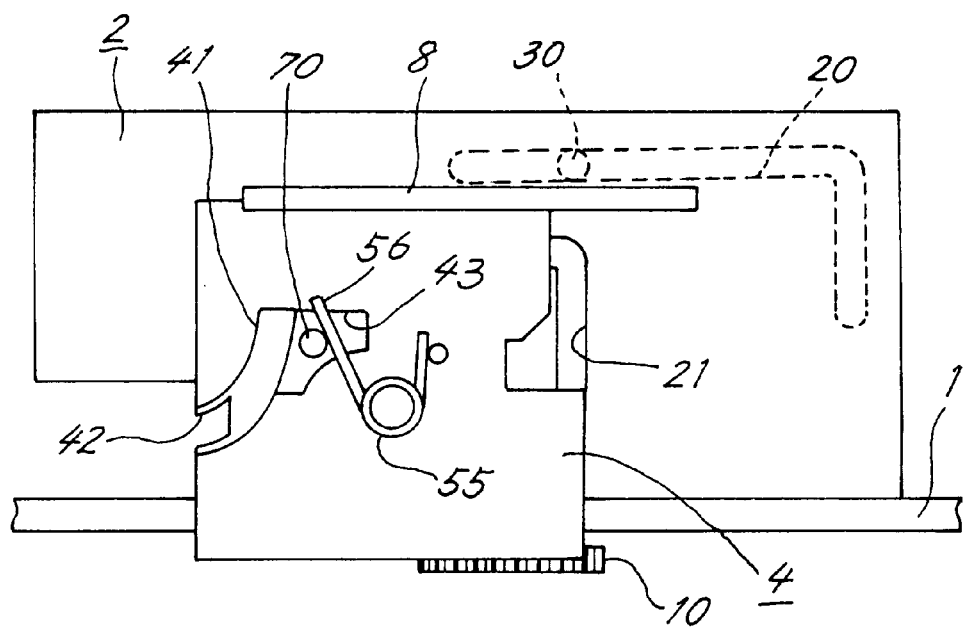

FIGS. 5A and 5B are side elevations showing the side plate 2 and the loading member 4 immediately after the start of cassette loading. The tray 3 pushed in by the cassette 6 moves the pivotal lever 7 clockwise.

However, the lever fitting pin 70 extending through the circular-arc aperture 22 in the side plate 2 moves through the window 43 of the loading member 4, merely deforming the torsion spring 55 by deflection and permitting the loading member 4 to remain at rest without rotating the operation gear 10 on the chassis 1.

When the tray 3 has been pushed in by the predetermined amount, a cassette sensor switch (not shown) disposed on the path of travel of the tray 3 is pushed and turned on, rotating the motor coupled to the operation gear 10. The loading member 4 meshing with the operation gear 10 moves the cassette loading direction. When the user releases the cassette 6 from the hand, the torsion spring 55 restores itself, and the tray 3 holding the cassette 6 thereon moves toward a loading completed position.

The pins 30, 31 of the tray 3 are positioned at the lower ends of the respective first and second guide slots 20, 21 on completion of loading as previously stated and as shown in FIG. 4A. At this time, the front end of the loading member 4 is brought close to the side edge of the elastic piece 26. This eliminates the likelihood of the loading member 4 moving to the mounted position (see FIG. 6B), preventing the member 4 from slipping off the side plate 2. Thus, the elastic piece 26 serves as a stopper for preventing the loading member 4 from slipping off inadvertently.

The loading member 4 is removable for a repair by pushing in the elastic piece 26 with the finger for deflective deformation and then moving the loading member 4 to the mounting position.

The engaging pieces 8, 80 are provided on the side plate 2 in corresponding relation with the upper end and the lower end of the loading member 4 and therefore serve to make the loading member 4 more compact than in the conventional mechanism wherein the two mount openings in the loading member 4 are arranged side by side along the loading direction.

Although the cutout 49 is formed in the lower end of the loading member 4 according to the present embodiment, the cutout 49 may be formed in the upper end of the loading member 4, with the first and second engaging pieces 8, 80 arranged in the reverse relation (not shown).

Figure 8:
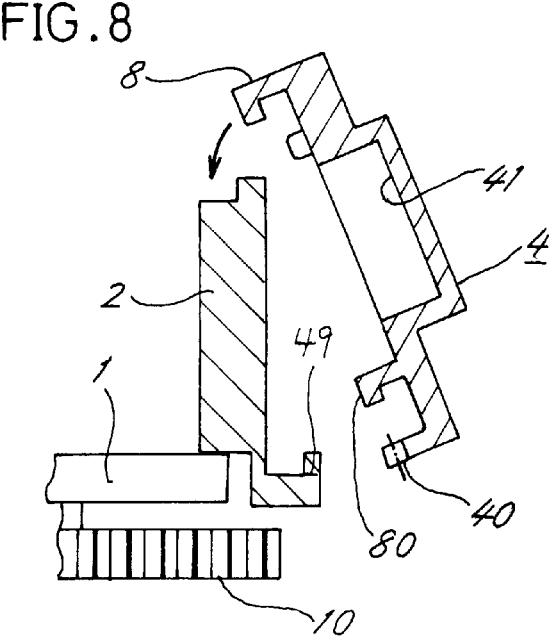
FIG. 8 is a view in section partly broken away and showing a side plate and a loading member according to another embodiment.

Alternatively, the loading member 4 may be provided with the first engaging piece 8 and the second engaging piece 80 and thereby caused to be engaged by the side plate 2 as shown in FIG. 8. In this case, the cutout 49 is formed in the side plate 2, such that the upper end of the side plate 2 is first fitted to the first engaging piece 8, and the second engaging piece 80 is then moved through the cutout 49 of the side plate 2 to inside thereof to mount the loading member 4 on the side plate 2.

What is claimed is:

1. A cassette loading mechanism comprising a tray disposed between side plates provided upright on a chassis and movable in a cassette loading direction for holding a cassette, and a loading member mounted on an outer surface of the side plate for driving the tray, the cassette loading mechanism being characterized in that:

the side plate is provided with a first and a second engaging pieces, parallel to each other and corresponding to a first end and a second end of the loading member, the first end of the loading member thereof corresponding to the first engaging piece has a cutout for permitting the loading member to interlock with said first engaging piece when positioned for mounting on the side plate, the loading member being mountable on the side plate by fitting the second end, not having the cutout, to the second engaging piece of the side plate and causing the first end of the loading member to clear said first engaging piece at the cutout and to interlock with of the first engaging piece, the loading member being slidable from a mounted position to move within a range in which the loading member is in engagement with the side plate.

2. A cassette loading mechanism according to claim 1 wherein the side plate is provided with an elastic piece deflectively deformable by being pushed by the loading member and corresponding in position to the mounted position of the loading member, the elastic piece being deflectively deformable with the loading member in its mounted position to permit the loading member to move to inside the engaging piece and the elastic piece restores itself to limit the movement of the loading member to the mounted position when the loading member is positioned away from the mounted position toward a cassette ejecting direction.

3. A cassette loading mechanism comprising a tray disposed between side plates provided upright on a chassis and movable in a cassette loading direction for holding a cassette, and a loading member mounted on an outer surface of the side plate for driving the tray, the cassette loading mechanism being characterized in that:

the loading member is provided with a first and a second engaging pieces, parallel to each other and corresponding to a first end and a second end of the side plate, the first end of the side plate thereof corresponding to the first engaging piece has a cutout for permitting the side plate to interlock with said first engaging piece when the loading member is positioned for mounting on the side plate, the loading member being mountable on the side plate by fitting the second engaging piece to the second end of the side plate not having the cutout and moving said first engaging piece through the cutout into the side plate, the loading member being slidable from a mounted position to move within a range in which the loading member is in engagement with the side plate.

* * * * *